June 3, 1930.  A. R. LE MOON  1,761,135
MOTOR TRUCK DRIVE MECHANISM
Filed July 2, 1928  2 Sheets-Sheet 1
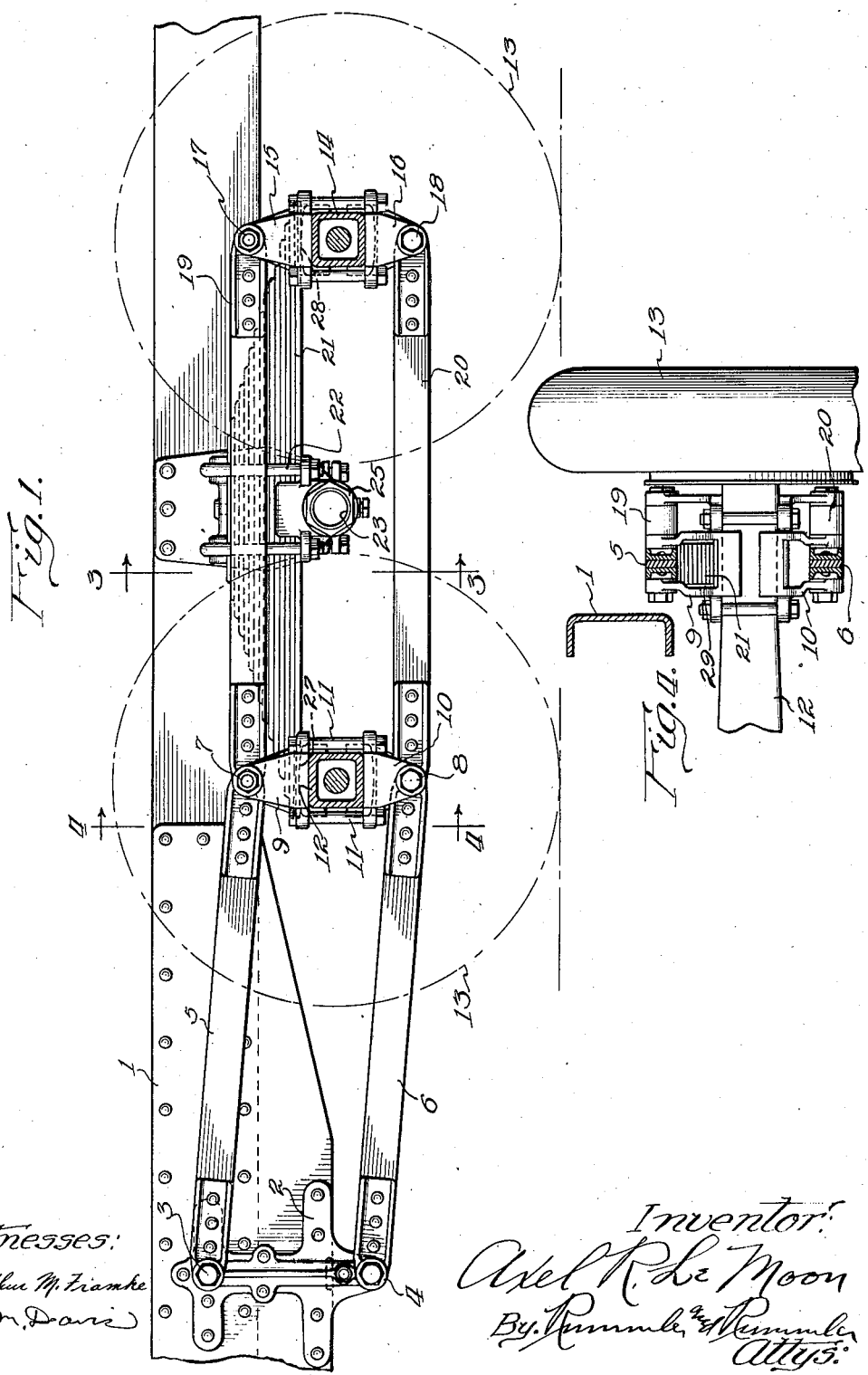

June 3, 1930.   A. R. LE MOON   1,761,135
MOTOR TRUCK DRIVE MECHANISM
Filed July 2, 1928   2 Sheets-Sheet 2
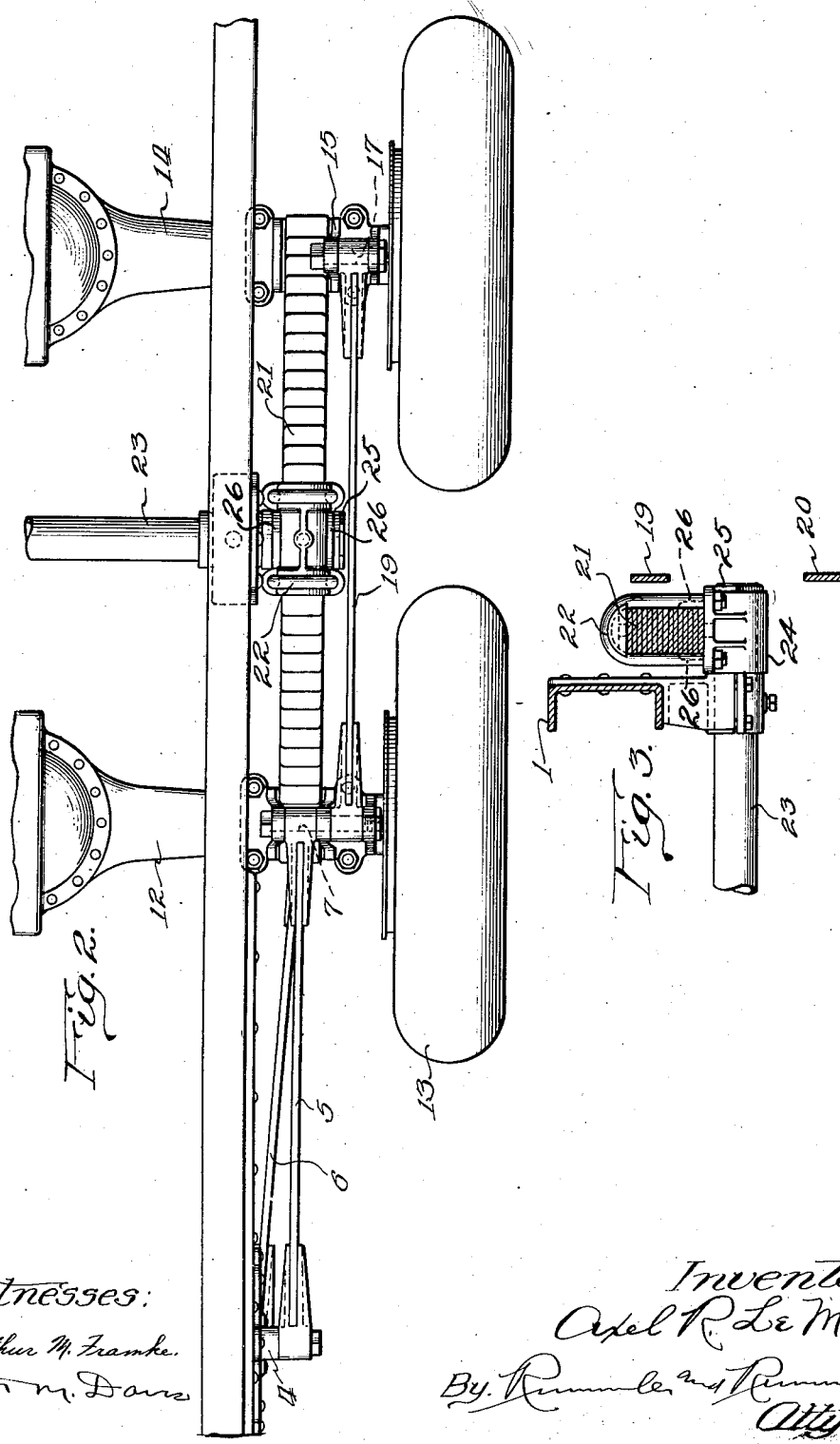

Patented June 3, 1930

1,761,135

UNITED STATES PATENT OFFICE

AXEL R. LE MOON, OF CHICAGO, ILLINOIS, ASSIGNOR TO NELSON-LE-MOON TRUCK COMPANY, OF CHICAGO, ILLINOIS, A CORPORATION OF ILLINOIS

MOTOR-TRUCK-DRIVE MECHANISM

Application filed July 2, 1928. Serial No. 289,810.

This invention relates to four-wheel drive constructions for motor vehicles. The purpose of the invention is mainly to avoid the use of complicated constructions, expensive joints, mechanism which is subject to undue wear or likely to require early replacements. It is therefore an object of the invention to simplify drive mechanism of this class and while providing an arrangement for supporting the vehicle on the drive unit which allows for the necessary vertical oscillation of the drive axle housings, prevents any turning movement of the housings and transmits the thrust from the driven wheels without giving, provision is also made for all the necessary flexibility or torsional movement of this mechanism when one axle housing oscillates laterally with respect to the other due to the wheels running over inequalities in the road surface.

The objects are accomplished by a construction as shown in the accompanying drawings, in which:—

Figure 1 is a side view of the improved drive unit showing the axle housing in section and the vehicle frame partly broken away.

Fig. 2 is a fragmentary plan view of the mechanism shown in Fig. 1.

Fig. 3 is a sectional detail taken on the line 3—3 of Fig. 1.

Fig. 4 is a sectional detail taken on the line 4—4 of Fig. 1.

The general features of the construction illustrated aside from a standard arrangement of drive axles and housings therefor and means for driving the drive axles, not shown, and the vehicle frame supported thereon are leaf springs centrally secured to the frame with their ends slidably resting upon the drive axle housings, parallel links above and below the housings but attached thereto by transversely extending pivots. Also connected to one of the housings by transverse pivots above and below the housings are a pair of links or thrust bars connecting the housings with vertically spaced transverse pivots on the vehicle frame. The links and thrust bars are formed of steel and so shaped as to allow for torsional or twisting motion thereof when one wheel rises or falls with respect to the remaining wheels due to unevenness of the road surface. The parallelogram arrangement of the links connecting the frame and both of the axle housings permits one housing to move upwardly or downwardly with respect to the other housinug while preventing either housing from turning on its axis.

Referring to the drawings, only one side of the vehicle is shown as the opposite side is a duplication thereof. The vehicle frame 1 is provided with brackets 2 on its sides which pivotally support at 3 and 4 the thrust bars 5 and 6. The bars 5 and 6 extend from the transverse pivots 3 and 4 on the brackets 2 to transverse pivot members 7 and 8 in the brackets 9 and 10 which are rigidly clamped by bolts 11 to the forward drive axle housing 12. These thrust bars 5 and 6 with their connections to brackets 2 and the housing 12 form a parallelogram which permits the housing to move upwardly and downwardly without turning on its axis. The bars 5 and 6 are so proportioned as to allow for the required torsional resilience when one of the wheels 13 mounted thereon is caused to move upwardly or downwardly with respect to the other due to unevenness in the road surface. The rear axle housing 14 also carries clamped thereto, the upwardly and downwardly extending bracket members 15 and 16 which carry pivots 17 and 18 for the links 19 and 20 which at their forward ends are mounted upon the pivots 7 and 8 carried by brackets 9 and 10 on the forward axle housing. The links 19 and 20 together with the axle housings and brackets thereon form a parallelogram which prevents one housing from turning on its axis with respect to the other but allows for relative vertical motion of the axle housings. The rear springs 21 of the vehicle are centrally supported on the frame 1 by clamping means 22 which connect the springs to a tie bar 23 extending between the side members of frame 1. The clamping means 22 includes a casting 24 which is free to oscillate with the spring around the tie bar 23 but is prevented from moving along the tie bar by nut 25. The casting 24 has upstanding flanges 26 closely fitting the sides of the spring in order to prevent any lateral shifting thereof. The free ends of the springs slidably rest upon the curved surfaces 27 and 28 of the brackets 9 and 15 between the upwardly extending ears thereof. This arrangement of the springs, without shackle connections, allows for the required motion between the same and the axle housing when the latter move up or down. If one axle housing moves up and the other one down, the spring as a whole may oscillate around its supporting member 23. The springs 21 serve to prevent undue lateral motion of the axle housings as the ends of the springs are located between the upstanding ears on the brackets 9 and 15 rigid with the housings but a space 29 (Fig. 4) is preferably provided between the ends of the springs and the ears on brackets 9 and 15 to allow slight lateral motion of the axle housings in order that the wheels may track more easily upon making a turn. Lateral motion of the drive unit is further restrained by links 6 which for this purpose may be slightly pitched inwardly toward the front of the vehicle as indicated in Fig. 2. The more or less horizontal plane within which the links 6 lie is parallel with the plane of links 5.

From the foregoing it may be seen that the weight of the vehicle through the springs 21 rests upon the rear axle housings and that by the simple linkage arrangement between the housings and the frame, the axles are maintained at right angles to the length of the truck and that the driving effect of the wheels is transmitted directly through the links to the frame and that oscillation of the axle housings on their axes is prevented. Usually more complicated and expensive constructions are employed for performing these functions.

In the operation of the drive mechanism described, the driving effect of the wheels is transmitted through the housings 12 and 14, links 19 and 20 and the links 5 and 6 to the vehicle frame. This linkage provides for a fixed relationship between the axle housings and between the latter and the machine frame in a longitudinal direction but due to the resilience of the linkage to torsional or twisting strains thereon one axle housing may move upwardly with respect to the other or may tilt laterally with respect to the machine but can not turn on its axis.

Although but one specific embodiment of this invention has been herein shown and described, it will be understood that numerous details of the construction shown may be altered or omitted without departing from the spirit of this invention as defined by the following claims.

I claim:

1. A vehicle frame, drive axle housings horizontally spaced apart beneath said frame and connected together by parallel links above and below said housings and pivoted thereto at their ends, parallel links extending from vertically spaced pivots on said frame to pivotal connections with one of said housings, and a leaf spring centrally secured to said frame and having its ends slidably bearing on said axle housings.

2. A vehicle frame, drive axle housings horizontally spaced apart beneath said frame and connected together by parallel links above and below said housings and pivoted thereto at their ends, parallel links extending from vertically spaced pivots on said frame to pivotal connections with one of said housings, and a leaf spring extended between said axle housings and centrally secured to said frame.

3. A vehicle frame, drive axle housings horizontally spaced apart beneath said frame and connected together by parallel links above and below said housings and pivoted thereto at their ends, parallel links extending from vertically spaced pivots on said frame to pivotal connections with one of said housings, the pivots for said links having horizontal axes to permit the links to swing in vertical planes, and a leaf spring extended between said axle housings and centrally secured to said frame.

4. A vehicle frame, drive axle housings horizontally spaced apart beneath said frame, a leaf spring extended between said axle housings and centrally secured to said frame, torsionally resilient parallel links above and below said housings and pivotally connected to the upper and lower side of one of said housings and at their opposite ends being connected with vertically spaced pivot members on said frame.

5. In a vehicle, a frame structure, a plurality of drive axle housings horizontally spaced apart beneath said frame, springs between said frame and axle housings, torsionally resilient parallel links above and below said axle housings and connecting said housings, pivotal connections between said links and housings at the upper and lower sides of said housings, vertically spaced pivots on said frame, and torsionally resilient parallel links extending from said pivots on the frame to connections with one of said drive axle housings.

Signed at Chicago this 28th day of June, 1928.

AXEL R. LE MOON.